(12) United States Patent
Parent

(10) Patent No.: US 6,475,382 B2
(45) Date of Patent: Nov. 5, 2002

(54) TREATMENT UNIT FOR TREATING A FLUID AND METHOD THEREOF

(75) Inventor: Carmen Parent, Québec (CA)

(73) Assignee: CO2 Solution Inc., Ste-Foy (CA)

( * ) Notice: Subject to any disclaimer, the term of this patent is extended or adjusted under 35 U.S.C. 154(b) by 28 days.

(21) Appl. No.: 09/740,768

(22) Filed: Dec. 19, 2000

(65) Prior Publication Data

US 2002/0074285 A1 Jun. 20, 2002

(51) Int. Cl.⁷ .................. B01D 24/04; B01D 27/02; B01D 27/08
(52) U.S. Cl. ............ 210/198.1; 210/199; 210/201; 210/206; 210/232; 210/252; 210/282; 210/336; 210/601; 210/632; 435/179; 435/180; 435/182; 55/308; 55/482
(58) Field of Search ................ 210/601, 632, 210/649–654, 198.1, 199, 201, 205, 206, 232, 252, 282, 336, 484, 500.27, 500.29, 500.28; 435/177, 179, 180, 182; 55/307, 308, 442, 443, 482, 485

(56) References Cited

U.S. PATENT DOCUMENTS

| | | | |
|---|---|---|---|
| 534,498 A | * 2/1895 | Descamps | |
| 1,450,770 A | * 4/1923 | Frick et al. | |
| 2,956,070 A | * 10/1960 | Jennings et al. | |
| 3,242,055 A | * 3/1966 | De Lucia | |
| 3,365,063 A | * 1/1968 | Cobb | |
| 3,610,418 A | * 10/1971 | Calderwood | |
| 4,067,809 A | * 1/1978 | Kato | |
| 4,072,615 A | * 2/1978 | McConnell | |
| 4,137,298 A | 1/1979 | Zielke et al. | 423/648 |
| 4,266,026 A | * 5/1981 | Breslau | |
| 4,307,195 A | 12/1981 | Karasawa et al. | 435/288 |
| 5,000,768 A | * 3/1991 | Hwang | |
| 5,057,421 A | 10/1991 | Hofmann et al. | 435/182 |
| 5,116,506 A | 5/1992 | Williamson et al. | 210/610 |
| 5,130,237 A | 7/1992 | Thomas et al. | 435/96 |
| 5,232,676 A | 8/1993 | Wolff et al. | 423/210 |
| 5,486,475 A | 1/1996 | Kramer et al. | 435/266 |
| 5,547,586 A | 8/1996 | Halperin et al. | 210/686 |
| 5,683,356 A | 11/1997 | Halperin et al. | 604/4 |
| 5,772,887 A | 6/1998 | Noah et al. | 210/617 |
| 5,795,750 A | 8/1998 | Kruse et al. | 435/128 |
| 5,902,747 A | 5/1999 | Nemser et al. | 435/325 |
| 5,945,002 A | 8/1999 | Leukes et al. | 210/651 |
| 6,051,411 A | 4/2000 | Turtakovsky et al. | 435/178 |
| 6,210,567 B1 | * 4/2001 | Takada | |

OTHER PUBLICATIONS

Schulz B. et al., "Influence of polymerization parameters and entrapment in poly(hydroxyethyl methacrylate) on activity and stability of GOD". Journal of Molecular Catalysis B : Enzymatic 7 (1999), pp. 85–91.

Holmberg K. et al., "Methods of immobilization of proteins to polymethylmethacrylate". Preparative Biochemistry, 15(3) (1985), pp. 309–319.

* cited by examiner

Primary Examiner—David A. Simmons
Assistant Examiner—Fred Prince
(74) Attorney, Agent, or Firm—Myer Bigel Sibley & Sajovec PA

(57) ABSTRACT

A treatment unit is disclosed for treating a fluid in continuous mode. This treatment unit provides the opportunity to carry out simultaneously an enzymatic transformation and a capture of a fluid element. The unit has a reservoir with a fluid inlet for receiving a fluid to be treated and a fluid outlet for releasing a treated fluid. The unit also has removable cassettes provided with a reactive material for treating the fluid and two spaced-apart baffle walls in the reservoir for regulating the flow of the fluid therein. The unit further has a reaction chamber defined between each of the two spaced-apart baffles walls. The reaction chamber has an opening for removably inserting therein the cassette. Yet, the unit further has mounting means for mounting the cassette in a reaction chamber spaced-apart from the two baffle walls, whereby a cassette is disposed between two spaced-apart baffle walls and causes the fluid to flow in a zigzag pattern thus further regulating the flow of the fluid.

31 Claims, 4 Drawing Sheets

TREATMENT UNIT FOR TREATING A FLUID AND METHOD THEREOF

FIELD OF THE INVENTION

The present invention generally relates to the field of fluid treatment. More specifically, it is directed to a treatment unit for treating a fluid in continuous. The treatment unit may advantageously be used for the removal of a substrate contained in a fluid either by its capture or by its biological transformation.

BACKGROUND OF THE INVENTION

Already known in the art and especially in the industries or the research/analysis laboratories, are treatment units for treating a fluid which generally operate either in batch or continuously. Very few of those units rely on the principle of baffles when enzymatic treatment or any other biological treatment are involved.

Overall, treatment units of the art often use, as reactive materials, enzymes or microorganisms confined, for instance, in a gel or held at the surface or incorporated to a membrane. Examples of such treatment units are shown in U.S. Pat. Nos. 5,057,421 and 5,772,887.

While the treatment units known in the art have resulted to the advancement within the present field, an important problem in this area continues to persist. This problem arises from the fact that the treatment units known in the art do not allow the removal of the reactive material support during the treatment process, and furthermore they do not provide the opportunity to carry out simultaneously the enzymatic transformation and the capture of a fluid element. Therefore, an interruption of the treatment process, for instance, after the saturation of the membranes or the weakening of the reactive material activity, leads to operation procedures which are very long and by the same token very expensive.

SUMMARY OF THE INVENTION

It is therefore an object of the present invention to provide a treatment unit for treating a fluid that will overcome these drawbacks.

In accordance with the present invention, that object is achieved with a treatment unit for treating a fluid in continuous mode. The unit comprises a reservoir which includes a fluid inlet for receiving a fluid to be treated and a fluid outlet for releasing a treated fluid, whereby a fluid in the reservoir is flowing from the fluid inlet towards the fluid outlet. The unit also comprises at least one cassette provided with a reactive material for treating the fluid and at least two spaced-apart baffle walls in the reservoir for regulating the flow of the fluid therein. A reaction chamber having an opening for removably inserting therein one of the at least one cassette is defined between each of the at least two spaced-apart baffle walls, Yet, the unit further comprises mounting means for mounting the at least one cassettes in a reaction chamber spaced-apart from the two baffle walls, whereby a cassette being disposed between two spaced apart baffle walls causes the fluid to flow in a zigzag pattern thus further regulating the flow of the fluid.

The present invention is also directed to a combination of a treatment unit as defined above with a similar treatment unit. The combination comprises connecting means for connecting the treatment units together.

The present invention also proposes a method for treating a fluid in continuous mode. The method comprises the steps of:

a) providing a treatment unit as defined above;
b) inserting in the reaction chamber defined between each of the at least two spaced-apart baffle walls a cassette provided with a reactive material;
c) mounting the cassette in the reaction chamber spaced-apart from the baffle walls and thereby defining a zigzag path between the baffle walls and the cassette for a flow of fluid flowing across the reservoir; and
d) continuously supplying the reservoir of the treatment unit with a fluid to be treated and containing a substrate, thereby causing the fluid to flow across the reaction chamber following the zigzag path and wherein the substrate reacts with the reactive material of the cassette, and then towards the fluid outlet to release a treated fluid.

A treatment unit according to the present invention proposes innovative features that makes it an economical tool for research or industrial applications. As a matter of fact, because of the versatility of such treatment unit, it becomes easy to biotransform a substrate, as well as to capture a proteinic element contained in a fluid. Furthermore, the treatment unit allows the simultaneous use of different kinds of cassette such as a dialysis cassette and those having at their surface an immobilisation support to which is coupled a reactive material. Moreover, the treatment unit of the present invention proposes the use of removable cassettes which impart to this invention an advantageous multifunctional feature.

BRIEF DESCRIPTION OF THE DRAWINGS

The present invention and its advantages will be more easily understood after reading the following non-restrictive description of a preferred embodiment thereof, made with reference to the following drawings wherein.

DESCRIPTION OF PREFERRED EMBODIMENTS

The present invention is directed to a treatment unit for treating a fluid in continuous mode. It will be understood that the present invention contemplates employing "a fluid" either of organic or inorganic nature.

The treatment unit of the present invention is able to fulfil two roles, namely the biotransformation of a substrate and/or the capture of an element, such as a protein contained in a fluid. In the present invention, biotransformation means the transformation of a substrate contained in a fluid into one or several products with the aid of reactive materials preferably selected from the group consisting of an enzyme such as a carbonic anhydrase or a glucose oxidase, a coenzyme, a cellular organelle such as a mitochondrion or a cell-membrane, an animal, plant or human cell and a microorganism. Whereas, in the case of the capture of a proteinic element, this is achieved with the aid of reactive materials involved in immunological reactions or in natural affinity interactions. Such reactive materials are preferably selected from the group consisting of an antibody, an antigen, a lectin, an adhesion molecule and a biological receptor.

Figure 1:
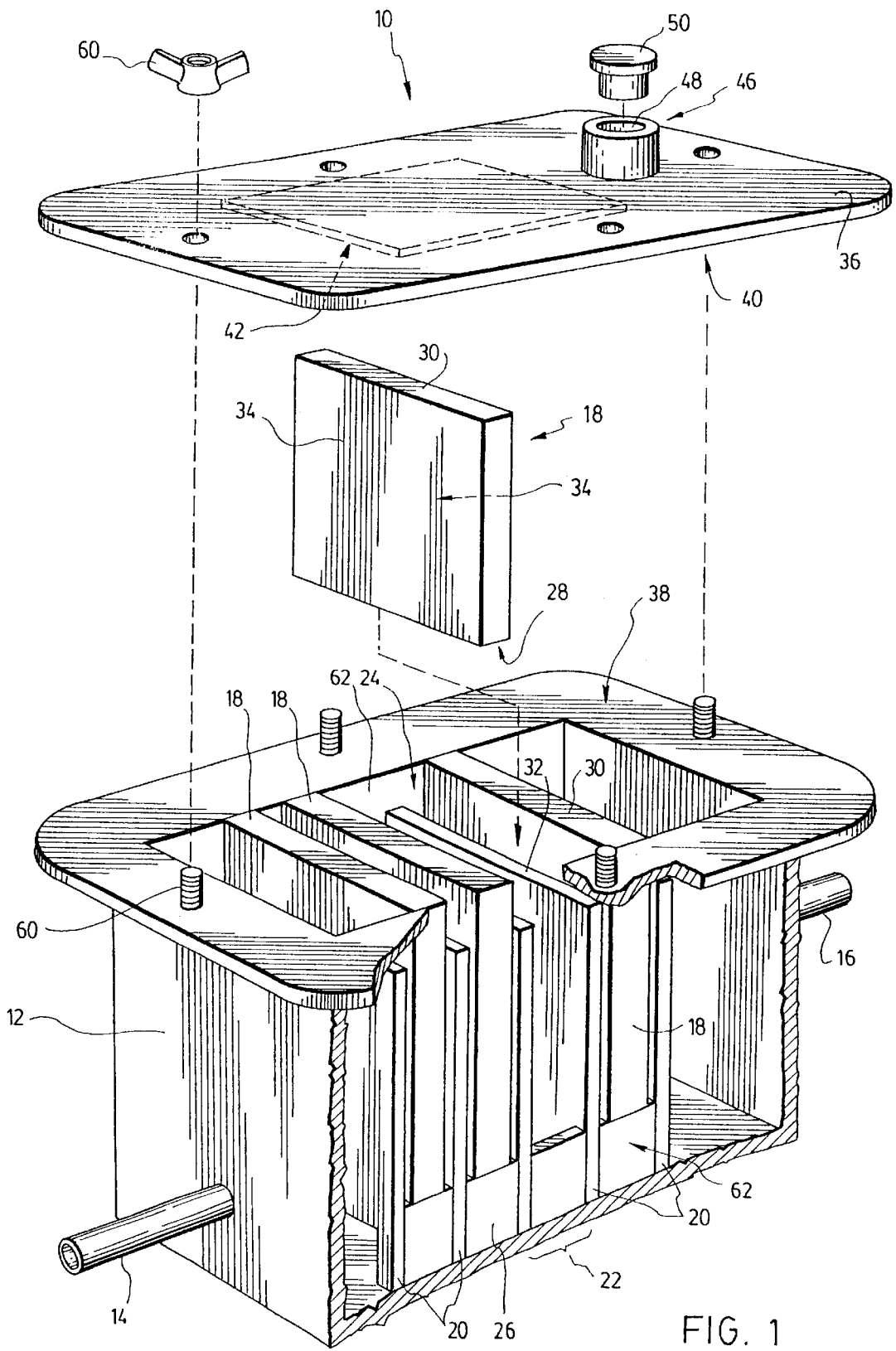
FIG. 1 is an exploded perspective view of a treatment unit according to a first preferred embodiment of the invention, with one side wall removed to better see the inside of the treatment unit.

Referring to FIG. 1, the treatment unit (10) of the present invention comprises a reservoir (12) which includes a fluid inlet (14) for receiving a fluid to be treated and a fluid outlet (16) for releasing a treated fluid. Such fluid in the reservoir is flowing from the fluid inlet (14) towards the fluid outlet (16). In order to regularize the fluid inflow, the treatment unit (10) is linked to a fluid inflow regulator, such as a pump.

At least two spaced-apart baffle walls (20) are provided in the reservoir (12) for regulating the flow of the fluid therein. The baffle walls (20), which extend across the reservoir (12) along all of its width, force a fluid to flow in a tangential manner during the whole treatment process. The baffle walls (20) also impede the creation of dead volume in the reservoir (12).

A reaction chamber (22) is defined between each of the two spaced-apart baffle walls (20). As can be appreciated, in the preferred embodiment illustrated, the treatment unit (10) includes four of these reaction chambers (22). Nevertheless, depending on the treatment process, only one reaction chamber (22) may suffice. Each of these reaction chambers (22) has an opening (24) for removably inserting therein a cassette (18) provided with a reactive material for treating a fluid. Advantageously, the cassette (18) also plays a role of "baffle". As a matter of fact, the disposition of a cassette (18) in a reaction chamber (22) (such disposition will be described herein below) forces a substrate contained in a fluid to encounter the reactive material of the cassette (18). In FIG. 1, one of these cassettes (18) is shown removed from its reaction chamber (22), as the other ones are shown inserted in their respective reaction chamber (22). The preferred embodiment shown in the figures contemplates employing a plurality of reaction chambers (22) disposed in sequence in the reservoir (12) so that a fluid flowing across the reservoir (12) flows in a tangential manner through each reaction chamber (22) consecutively. Furthermore, the number of reaction chambers as well as the dimension of the treatment unit (10) are a function of the speed of treatment reaction as well as of the concentration of substrate in the fluid.

The reservoir (12) finally comprises mounting means for mounting the cassette (18) in the reaction chamber (24) in such a way that the cassette (18) is spaced-apart from the two baffle walls (20). The mounting means preferably comprises a support member (26) disposed between the two baffle walls (20) in order to support a bottom edge (28) of the cassette (18). As illustrated in FIG. 1, the support member (26) may be a shoulder (26) coupled to each of the opposite side walls (62) of the reaction chamber (22) when the latter extends transversally in the reservoir (12). The support member (26) could also consist of only one shoulder disposed approximately in a lower central area of the reaction chamber (22). It will be understood that although as a support member a shoulder is preferred, the present invention contemplates employing other types of support members, such as flanges.

It is also preferable that, once mounted on the support member (26), the top edge (30) of the cassette (18) stands higher than the top edge (32) of the baffle walls (20). Notwithstanding this particular preference, a treatment unit (10) having the top edge (30) of the cassette (18) that stands equal to the top edge (32) of the baffle walls (20) could be used even if such treatment unit (10) would not be as efficient. Consequently and as better seen in FIG. 2, the preferable layout of the structural elements of the reaction chamber (22) causes the fluid to flow in a zigzag pattern, and thus further regulates the flow of the fluid.

Also preferably, the treatment unit (10) comprises a lid (36) for removably closing an open top (38) of the reservoir (12). Such lid (36) may be used in order to avoid any leakage of the fluid. In other cases, it may be an advantage to use a lid when the chosen treatment process involves aseptic conditions. Thus, eventhough the use of a lid is a preferable feature, it will be understood that without a lid, a treatment unit of the present invention would still keep its treatment capabilities.

Fastening means (60) are provided for securing the lid (36) to the open top (38) of the reservoir (12). Despite the fact that the present invention prefers employing bolts and nuts as the fastening means (60), it will be understood that any other fastening means commonly known will suffice. The number of bolts and nuts as well as their dimensions are variable according to the size of the treatment unit used.

In this case, the mounting means preferably further comprises at least one retainer (42) in the underface (40) of the lid (36) adapted to hold the top edge (32) of a cassette (18). The retainer (42) is located on the underface (40) in such a manner that the cassette (18) is set spaced-apart from and substantially in parallel to the two adjacent baffle walls (20). The retainer (42) may be made of semirigid or spongy materials, such as a foam-like material. It could be made of a one piece material, as in FIG. 1 or it could consist of a plurality of stripes of material, each strip being capable of retaining a cassette. Other kinds of retainers (42) may be also considered. An example of this may be a pair of flanges disposed on the underface (40) of the lid (36) so that the top edge (32) of a cassette (18) is trapped between the flanges. A pair of flanges could also be used even if, for instance, the flanges were projecting sideways from the baffle walls (20) of a reaction chamber (22) instead from the lid (36). In this case, the cassette (18) would have to be slipped between the flanges.

Figure 2:
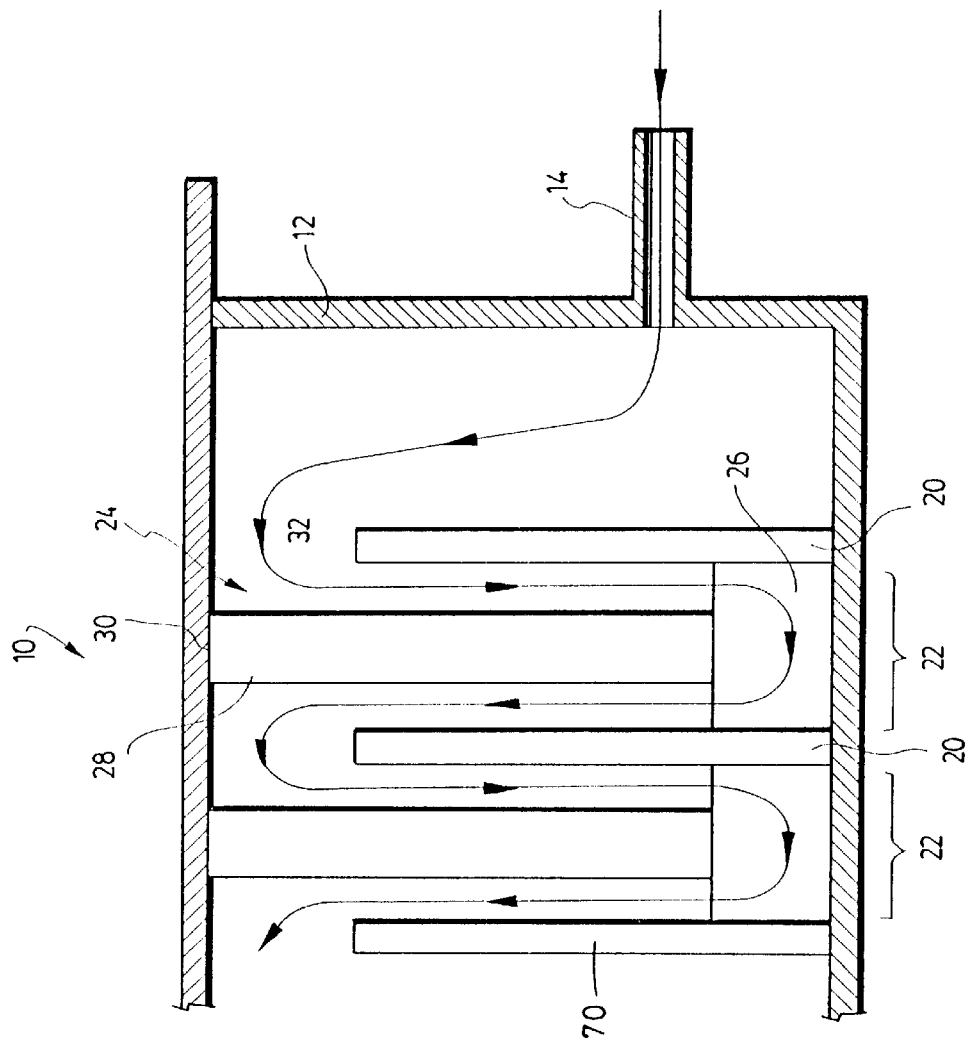
FIG. 2 is a cross-sectional side view of a portion of the treatment unit of FIG. 1, illustrating a flow of a fluid across two reaction chambers.

According to a preferred embodiment, baffle walls (20) as described above may be replaced by removable baffle walls (70) provided with a reactive material (FIG. 2). In such a case, the removable baffle wall (70) can take the form of any type of cassettes (18) of the present invention. The removable baffle walls (70) will still force a fluid to flow in a tangential manner during a treatment process but it will also play the role of treating a fluid.

Figure 3:
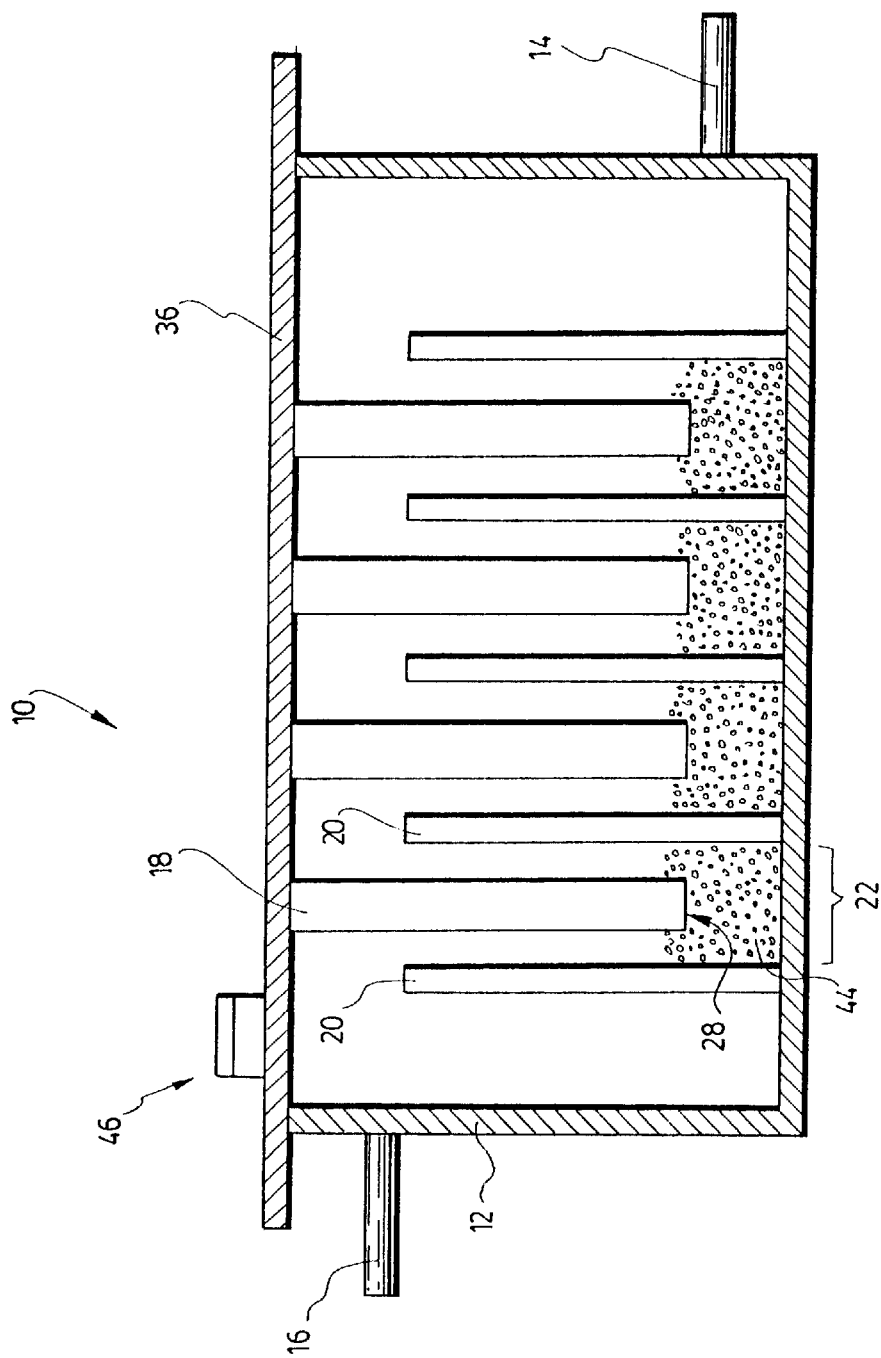
FIG. 3 is a cross-sectional side view of a treatment unit according to a second preferred embodiment of the invention, wherein a biocatalytic bed is used as a support member.

According to another preferred embodiment illustrated in FIG. 3, the mounting means comprises a biocatalytic bed (44) disposed between the baffle walls (20) for supporting the bottom edge (28) of the cassette (18), whereby the fluid is forced to pass through the biocatalytic bed (44) in order to be treated. Thus, the biocatalytic bed (44) allows the optimisation of biological and/or biochemical reactions by providing a complementary treatment to the one carried out by a cassette (18). This complementary treatment may use the same reactive material or a different one. The biocatalytic bed (44) may be made of a granular support such as marbles, grains, particle cylinders of different shapes. Preferably, the biocatalytic bed (44) is made of a granular support selected from the group consisting of polymethylmethacrylate, nylon, polystyrene, polyurethane, silica and alumina. It will be undestood that any other granular support capable of immobilizing a reactive material may be used. The coupling of the reactive material to the granular support is achieved with any method known to one skilled in the art.

A feature of the present invention is that, depending on the desired treatment process, the cassette (18) can take different forms in order to be an adequate support for a reactive material. Therefore, the cassette (18) may be made of a polymer selected from the group consisting of polymethylmethacrylate, nylon, polyester and polystyrene. Such polymeric cassette (18) constitutes therefore a suitable support for the direct immobilization or coupling of the reactive material on one or both faces (34) of the polymeric cassette (18). The coupling of the reactive material to the polymeric cassette is achieved with any method known by one skilled in the field of the invention.

Alternatively, the cassette (18) may preferably be made of another type of polymer, such as plexiglass, or a material such as glass, metal or any other material suitable for the characteristics of the type of fluid to be treated. With this type of cassette (18), one or both faces (34) of the cassette is covered with a membrane to which is coupled the reactive material. Such membrane may be made of nitrocellulose, nylon, poly(vinylidene)fluoride, chitin, chitosan, agarose, acrylamide, calcium alginate, cotton, polyester, rayon or any other membrane that will be apparent to one skilled in the field. Therefore, these two types of cassettes (18) which have a reactive material either coupled to a polymer or a membrane allow the reactive material to be in direct contact with a fluid flowing in the reaction chamber (22).

The cassette (18) may also preferably consist of a dialysis module comprising a pair of dialysis membranes and an enclosed space therebetween. Thus, in this case, the reactive material is contained in the enclosed space and becomes in contact with the fluid when the latter passes through the dialysis membranes.

Referring back to FIG. 1, the treatment unit (10) preferably further comprises inserting means (46) for inserting a measuring element in the reservoir (12). Such measuring element may be a pH electrode or a conductivity probe. The inserting means (46) may also be used for adding chemical and/or buffer solutions into the reservoir (12) for regulating treatment parameters which will be known to one skilled in the art. The inserting means (46) preferably comprises an opening (48) in the lid (36) of the reservoir (12) and a plug (50) insertable therein, whereby the plug (50) is removed to insert a measuring element or to add a chemical solution. It will be understood that depending on the treatment process, more than one opening may be required. As can be appreciate in FIGS. 1 and 3, when an opening (48) is disposed in the vicinity of the fluid outlet (16), it is preferable that the fluid outlet (16) be disposed high enough in order to provide accumulation of the fluid. This will facilitate the use of a measuring element.

Figure 4:
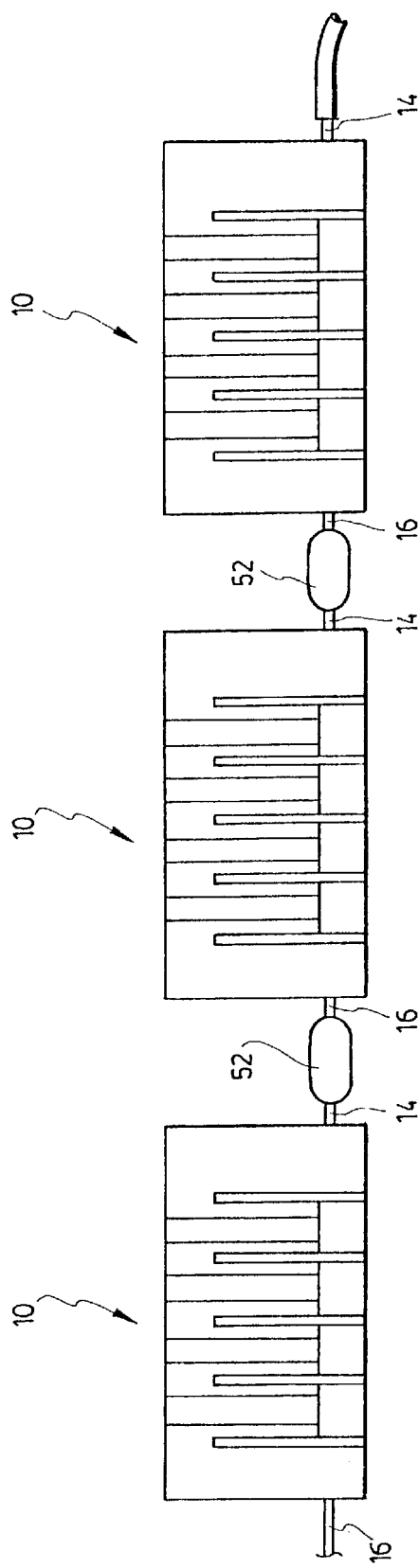
FIG. 4 is a cross-sectional side view of a combination of treatment units as shown in FIG. 1.

Referring to FIG. 4, the present invention is also directed to a combination of a treatment unit (10) as defined above with a similar treatment unit (10). The combination comprises connecting means for connecting the treatment units (10) together. A tube (52) for hermetically connecting the fluid outlet (16) of one of the treatment unit (10) to the fluid inlet (14) of the other treatment unit (10) is one example of a connection means that can be used. Advantageously, this combination makes it possible to change easily a treatment unit (10) or to modify the quality of the fluid to be treated simply by varying the number of treatment units (10). The size, shape and dimension of the treatment units (10) and the number of units (10) disposed in sequence is adaptable according to the needs of a user and to the type of application (research or industrial applications).

Advantageously, a treatment unit (10) of the present invention may be linked to a decantation unit so as to allow the decantation of one or several reaction products. The decantation unit is useful in the extent that one of the reaction products is desired in a solid form. The flowing fluid, once treated by the reactive material, is led into a precipitation chamber containing a solution capable of reacting with the product. A chemical reaction is established which leads to the desired precipitation. A discharge means, such as an outlet disposed at the base of the precipitation chamber of the decantation unit, enables to remove or collect the precipitate product. Following the precipitation chamber, a fluid collecting chamber may be provided in order to allow the fluid to accumulate itself before being discarded by a fluid outlet preferably disposed near the top edge of the decantation unit. The fluid collecting chamber may serve also as a second decantation chamber which would allow a further precipitation process for products that could have escaped from the first decantation chamber.

As mentioned above, the decantation unit can follow one or several treatment units, but could also be an integral part of a treatment unit of the present invention. In this case, a decantation chamber would be in fluid communication with a reaction chamber (22) in the reservoir (12).

According to another aspect of the present invention, a method for treating a fluid in continuous is proposed. This method provides great flexibility in choosing operating conditions to optimize the treatment process of a fluid. That is, for instance, the unique opportunity of removing during the treatment process a cassette (which includes a reactive material) in order to substitute it for another one with the same or a different reactive material. The method according to the present invention comprises the steps of:

a) providing a treatment unit (10) as defined above;

b) inserting in the reaction chamber (22) defined between each of the at least two spaced-apart baffle walls (20) a cassette (18) provided with a reactive material;

c) mounting said cassette (18) in the reaction chamber (22) spaced-apart from the baffle walls (20) and thereby defining a zigzag path between the baffle walls (20) and the cassette (18) for a flow of fluid flowing across the reservoir (12); and d) continuously supplying the reservoir (12) of the treatment unit (10) with a fluid to be treated and containing a substrate, thereby causing said fluid to flow across the reaction chamber (22) following the zigzag path and wherein the substrate reacts with the reactive material of the cassette (18), and then towards the fluid outlet (16) to release a treated fluid.

Step a) can be modified by further connecting the treatment unit (10) to another treatment unit (10). Step a) can be further modified by connecting a decantation unit to a treatment unit.

In a preferred embodiment, step c) is modified by supporting a bottom edge (28) of the cassette (18). Step c) may be further modified by retaining a top edge (30) of the cassette (18).

The method may further comprise the step of:

e) closing an open top (38) of the reservoir (12) with a removable lid (36).

Preferably, step e) may be modified in order to hermetically fasten the lid (36) to the open top (38) of the reservoir (12).

EXAMPLES

Example 1

Type of Application

This model allows the use of reactive materials (cofactors and coenzymes) which are stuck or bound to a support, such as a cassette (18) according to the present invention. These reactive materials used can also be integral part of the material constituting the support. The fluid to be treated (containing a substrate) is flowing along the baffle walls (20) and cassettes (18). When the fluid flows along the sides of a cassette (18), the substrate is captured and transformed by the reactive material of the cassette (18). The product is then released in the fluid and flows through the fluid outlet (16) of the treatment unit (10) of the present invention.

By way of an example, a support or cassette (18) of poly(hydroxyethyl methacrylate) containing an enzyme, such as glucose oxidase is prepared according to Schulz et al. (1999. Influence of polymerisation parameters and entrapment in poly(hydroxyethyl methacrylate) on activity and stability of GOD, *Journal of molecular catalysisB; Enzymatic*. 7: 85–91).

The preparation of the new support must contain the dimensions of the cassette (18). The use of this cassette (18) allows not only the enzymatic transformation of the substrate brought on by the fluid but also by the easy replacement of the spent cassette (18).

Type of Support Used

Any support having the following characteristics can serve as a cassette (18) according to the present invention.

A rigid structure

A composition allowing the chemical or physical adhesion of reactive materials

A composition compatible with the fluid to be treated

Preparation of the support that can support the confinement of the reactive materials (in the case of reactive materials confined in the structure of the support).

The types of membranes that can be used are:

for support and sequestration: Poly(hydroxyethyl methacrylate, etc.

for support/adhesion or covalent bound: nylon, poly methyl methacrylate, polystyrene, polystyrene etc.

Example 2

Use of fine membranes resting against the faces of the cassette (18).

Type of Application

The side of a membrane that does not contain the reactive material is resting against a face (34) of the cassette (18). The cassette (18) can be covered by this membrane on each of these two faces (34). The fluid will flow in a transversal fashion along the membrane face covered by the reactive material. Lab experiments show that a membrane of nitrocellulose can contain between 80 and 100 micrograms of enzyme by square centimetres of surface. Trials with a cassette (18) having a nitrocellulose membrane coated by carbonic anhydrase show that a flow of 240 ml/min is sufficient to initiate the treatment. At the end of the treatment, pH readings will allow the evaluation of the activity of the enzyme compared to a membrane without any enzyme. The results show a much more rapid transformation of dissolved $CO_2$ in water to bicarbonate ions. Since the pH drop is very slow for a membrane without enzyme, it is possible to register a decrease from 7.8 to 6.9 in values of pH in only 15 seconds when the carbonic anhydrase membrane is used.

Type of Membrane Used

The membranes used must have the following characteristics:

a thin and malleable membrane, a membrane cut to the dimensions of the cassette (18), a composition allowing the chemical or physical adhesion of reactive material, and a composition compatible with the fluid to be treated.

The membranes that can be used are the nitrocellulose, the nylon membranes, the PVDF, or any suitable membrane that will be apparent to one skilled in the art.

Example 3

The use of dialysis cassettes (18) containing free reactive material or retained in a hydrogel (agarose, acrylamide, or the like).

Type of Application

Water penetrates the treatment unit (10) at an optimised flow, taking into account the type and the speed of the biotransformation and the dialysis of the products. The cassette (18) contains the reactive material (such as bacteria, organites or enzymes) between two permeable membranes. Water must circulate slowly in such a way that promotes diffusion of the substrate across the porous membranes of the dialysis cassette (18). The substrate then becomes available for the biotransformation by the reactive material. The product of the reaction accumulates between the interstice of the two permeable membranes. The difference in concentration between the fluid that circulates and the one that is present inside the cassette (18) allows for the diffusion of the products towards the exterior of the cassette (18). This type of application of the system for the treatment of fluids does not require a chemical or physical attachment of the reactive material.

Type of Membrane Used

Any membrane known to a person in the art may be used in this type of treatment process. The porosity of the membrane must be superior to the size of the substrate to be transformed and of the particles produced following the biotransformation. The membrane must be compatible with the fluid to be treated.

Although preferred embodiments of the present invention have been described in detail herein and illustrated in the accompanying drawings, it is to be understood that the invention is not limited to these precise embodiments and that various changes and modifications may be effected therein without departing from the scope or spirit of the present invention.

What is claimed is:

1. A treatment unit for treating a fluid in continuous mode, the unit comprising a reservoir including:

a fluid inlet for receiving a fluid to be treated; and a fluid outlet for releasing a treated fluid, whereby a fluid in the reservoir is flowing from the fluid inlet towards the fluid outlet;

at least one cassette provided with a reactive material for treating the fluid;

at least two spaced-apart baffle walls in the reservoir for regulating the flow of the fluid therein;

a reaction chamber defined between each of said at least two spaced-apart baffles walls, and having an opening for removably inserting therein one said at least one cassette;

and mounting means for mounting said one cassette in a reaction chamber spaced-apart from the two baffle walls;

whereby a cassette being disposed between two spaced apart baffle walls causes the fluid to flow in a zigzag pattern thus further regulating the flow of the fluid.

2. A treatment unit according to claim 1, wherein said at least one cassette has a top edge and a bottom edge and the mounting means comprises a support member disposed between said at least two baffle walls to support the bottom edge of the cassette.

3. A treatment unit according to claim 2, wherein:
each of said at least two spaced-apart baffle walls has a top edge; and
said at least one cassette is sized such that, once mounted on the support member, the top edge thereof stands higher than the top edge of said at least two spaced-apart baffle walls.

4. A treatment unit according to claim 3, wherein the reservoir has an open top and the treatment unit comprises a lid for removably closing said top and fastening means for securing the lid to the open top of the reservoir.

5. A treatment unit according to claim 4, wherein the lid has an underface and the mounting means comprises at least one retainer in said underface of the lid adapted to hold the top edge of a corresponding one of said at least one cassette, the retainer being located on said underface in such a manner that said at least one cassette is set spaced-apart from and substantially in parallel to the two adjacent baffle walls.

6. A treatment unit according to claim 5, wherein:
the reaction chamber extends transversally in the reservoir and includes two opposite side walls, and
the support member comprises a shoulder coupled to each of said opposite side walls of the reaction chamber.

7. A treatment unit according to claim 1, comprising a series of reaction chambers disposed in sequence, whereby a fluid flowing across the reservoir flows through each reaction chamber consecutively.

8. A treatment unit according to claim 7 further comprising a decantation chamber in the reservoir preceding or following the series of reaction chambers and being in fluid communication therewith.

9. A treatment unit according to claim 1, wherein the mounting means comprises a biocatalytic bed disposed between each of said at least two baffle walls for supporting said at least one cassette.

10. A treatment unit according to claim 9, wherein the biocatalytic bed is made of a granular support selected from the group consisting of polymethylmethacrylate, nylon, polystyrene, polyurethane, silica and alumina.

11. A treatment unit according to claim 1 wherein the cassette comprises two opposite faces and a membrane covering at least one of said opposite faces, the reactive material of the cassette being coupled to the membrane whereby the reactive material is in direct contact with a fluid flowing in the reaction chamber.

12. A treatment unit according to claim 11 wherein the membrane is covering both of said two opposite faces.

13. A treatment unit according to claim 12, wherein the membrane is made of nitrocellulose, nylon, poly(vinylidene) fluoride, chitin, chitosan, agarose, acrylamide, calcium alginate, cotton, polyester, or rayon.

14. A treatment unit according to claim 1, wherein the cassette is a dialysis module comprising a pair of dialysis membranes and an enclosed space between said dialysis membranes, said reactive material being contained in said enclosed space.

15. A treatment unit according to claim 1, wherein the cassette is made of a polymer selected from the group consisting of polymethylmethacrylate, nylon, polyester and polystyrene, said reactive material being coupled to the polymer.

16. A treatment unit according to claim 1, wherein said reactive material is selected from the group consisting of an enzyme, a coenzyme, a cellular organelle, an animal, plant or human cell, a microorganism, an antibody, an antigen, a lectin, an adhesion molecule, and a biological receptor.

17. A treatment unit according to claim 16, wherein the cellular organelle is a mitochondrion or a cell-membrane.

18. A treatment unit according to claim 16, wherein the enzyme is a carbonic anhydrase or a glucose oxidase.

19. A treatment unit according to claim 1, wherein the treatment unit further comprises inserting means for inserting a measuring element in the reservoir.

20. A treatment unit according to claim 19, wherein the inserting means comprise an opening in the lid of the reservoir and a plug insertable therein, whereby the plug is removed to insert a measuring element.

21. A treatment unit according to claim 1, wherein at least one of said baffle walls consist of a removable baffle wall provided with a reactive material.

22. A combination of at least two treatment units as defined in claim 1, the combination comprising connecting means for connecting the treatment units together.

23. A combination as claimed in claim 22, wherein the connecting means comprises a tube for hermetically connecting the fluid outlet of one of the treatment units to the fluid inlet of the other treatment unit.

24. A combination of a treatment unit as defined in claim 1 with a decantation unit.

25. A method for treating a fluid in continuous mode, the method comprising the steps of:
a) providing a treatment unit as defined in claim 1;
b) inserting in the reaction chamber defined between each of the at least two spaced-apart baffle walls a cassette provided with a reactive material;
c) mounting said cassette in the reaction chamber spaced-apart from the baffle walls and thereby defining a zigzag path between the baffle walls and the cassette for a flow of fluid flowing across the reservoir; and
d) continuously supplying the reservoir of the treatment unit with a fluid to be treated and containing a substrate, thereby causing said fluid to flow across the reaction chamber following the zigzag path and wherein the substrate reacts with the reactive material of the cassette, and then towards the fluid outlet to release a treated fluid.

26. A method according to claim 25, wherein step a) of providing a treatment unit comprises the step of:
connecting the treatment unit to another treatment unit.

27. A method according to claim 26, wherein step a) of providing a treatment unit further comprises the step of:
connecting the treatment unit to a decantation unit.

28. A method according to claim 27, wherein step c) comprises the step of:
supporting a bottom edge of the cassette.

29. A method according to claim 28, wherein step c) further comprises the step of:
retaining a top edge of the cassette.

30. A method according to claim 25, further comprising the step of:
e) closing an open top of the reservoir with a removable lid.

31. A method according to claim 30, wherein step e) comprises the step of:
hermetically fastening the lid to the open top of the reservoir.

* * * * *